United States Patent
Bansal et al.

(10) Patent No.: US 7,808,939 B2
(45) Date of Patent: Oct. 5, 2010

(54) ROUTING IN WIRELESS AD-HOC NETWORKS

(75) Inventors: Nikhil Bansal, Pittsburgh, PA (US); Zhen Liu, Tarrytown, NY (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 454 days.

(21) Appl. No.: 10/402,760

(22) Filed: Mar. 28, 2003

(65) Prior Publication Data

US 2004/0190476 A1   Sep. 30, 2004

(51) Int. Cl.
   H04B 7/00   (2006.01)
(52) U.S. Cl. ...................................... 370/310
(58) Field of Classification Search ................. 370/254, 370/255, 256, 299, 310, 328, 338, 349, 386, 370/400, 401, 402, 351, 395.32, 238, 238.1, 370/248, 270, 310.2, 312, 389, 390, 393, 370/331, 332, 343, 344, 252
   See application file for complete search history.

(56) References Cited

U.S. PATENT DOCUMENTS

| | | | | |
|---|---|---|---|---|
| 5,987,011 | A * | 11/1999 | Toh | 370/331 |
| 6,535,498 | B1 * | 3/2003 | Larsson et al. | 370/338 |
| 6,590,928 | B1 * | 7/2003 | Haartsen | 375/134 |
| 6,704,293 | B1 * | 3/2004 | Larsson et al. | 370/255 |
| 6,751,200 | B1 * | 6/2004 | Larsson et al. | 370/255 |
| 6,775,255 | B1 * | 8/2004 | Roy | 370/331 |
| 6,775,258 | B1 * | 8/2004 | van Valkenburg et al. | 370/338 |
| 6,834,192 | B1 * | 12/2004 | Watanabe et al. | 455/444 |
| 6,907,257 | B1 | 6/2005 | Mizutani et al. | |
| 7,027,426 | B2 * | 4/2006 | Billhartz | 370/338 |
| 7,039,358 | B1 * | 5/2006 | Shellhammer et al. | 455/41.2 |
| 2001/0002906 | A1 * | 6/2001 | Rune | 370/345 |
| 2001/0002908 | A1 * | 6/2001 | Rune et al. | 370/392 |
| 2001/0002912 | A1 * | 6/2001 | Tony et al. | 370/487 |
| 2001/0005368 | A1 * | 6/2001 | Rune | 370/390 |
| 2001/0053669 | A1 | 12/2001 | Kado et al. | |
| 2002/0044549 | A1 * | 4/2002 | Johansson et al. | 370/386 |
| 2002/0089963 | A1 * | 7/2002 | Kang et al. | 370/340 |
| 2003/0054767 | A1 * | 3/2003 | Mandhyan et al. | 455/41 |
| 2003/0060222 | A1 * | 3/2003 | Rune | 455/517 |
| 2003/0110291 | A1 * | 6/2003 | Chen | 709/244 |
| 2003/0202465 | A1 * | 10/2003 | Cain | 370/225 |

FOREIGN PATENT DOCUMENTS

| | | |
|---|---|---|
| JP | 08-037535 | 6/1996 |
| JP | 11-239176 | 8/1999 |

(Continued)

OTHER PUBLICATIONS

P. Gupta et al., "The Capacity of Wireless Networks," IEEE Transactions on Information Theory, 46(2), pp. 388-404, 2000.

(Continued)

*Primary Examiner*—Brenda Pham

(57) ABSTRACT

Efficient routing techniques that meet performance objectives associated with an ad-hoc network environment and the like. More specifically, the invention provides a routing methodology proven to provide high (e.g., close-to-optimal) throughput and low delay guarantees. Further, the present invention preferably considers a network with both static and mobile nodes. The mobile nodes preferably follow a particular model of movement, referred to herein as a mobility model.

29 Claims, 3 Drawing Sheets

FOREIGN PATENT DOCUMENTS

| | | |
|---|---|---|
| JP | 11239176 | 8/1999 |
| JP | 2001-156787 | 6/2001 |
| JP | 2001-268128 | 9/2001 |
| JP | 2002-009783 | 1/2002 |
| JP | 2002009783 | 1/2002 |
| JP | 2001156787 | 6/2002 |
| JP | 2003-087169 | 3/2003 |
| WO | WO 02/25968 A1 | 3/2002 |

OTHER PUBLICATIONS

M. Grossglauser et al., "Mobility Increases the Capacity of Ad-hoc Wireless Networks," Proceedings of IEEE Infocom '01, Apr. 2001.

D.B. Johnson et al., "Dynamic Source Routing in Ad-hoc Wireless Networks," Mobile Computing, vol. 353, Kluwer Academic Publishers, pp. 1-18, 1996.

B. Liang et al., "Predictive Distance-Based Mobility Management for PCS Networks," Proceedings of IEEE Infocom '99, pp. 1-8, 1999.

H. Xie et al., "Mobility Models and Biased Sampling Problem," IEEE ICUPC, vol. 2, pp. 803-807, 1993.

X. Hong et al., "A Group Mobility Model for Ad Hoc Wireless Networks," 8 pages, 1999.

J. Li et al., "A Scalable Location Service for Geographic Ad Hoc Routing," ACM Mobicom, 11 pages, 2000.

J.D.C. Little, "A Proof of the Queuing Formula $l = \lambda w$," Operations Research, vol. 9, pp. 383-387, 1961.

P. Gupta et al., "Internets in the Sky: The Capacity of Three Dimensional Wireless Networks," Communications in Information and Systems, 2001, pp. 1-22.

B. Hajek et al., "On the Capture Probability for a Large Number of Stations," IEEE Transactions on Communications, Feb. 1997, pp. 254-260, vol. 45, No. 2.

S. Murthy et al., "An Efficient Routing Protocol for Wireless Networks," Mobile Networks and Applications, 1996, 27 pages, vol. 1.

V.D. Park et al., "A Highly Adaptive Distributed Routing Algorithm for Mobile Wireless Networks," Procs. IEEE Infocom, 1997, 9 pages.

C.E. Perkins et al., "Ad-hoc On-Demand Distance Vector Routing," Proc. of the 2nd IEEE Workshop on Mobile Computing Systems and Applications, 1999, 11 pages.

I. Stojmenovic et al, "Routing with Guaranteed Delivery in Ad Hoc Wireless Networks," Proc. of 3rd ACM Int. Workshop on Discrete Algorithms and Methods for Mobile Computing and Communications (DIAL M99), Aug. 1999, pp. 48-55, Seattle.

R. Ramanathan et al., "Topology Control of Multihop Wireless Networks using Transmit Power Adjustment," Proc. IEEE Infocom, 2000, 10 pages.

V. Rodoplu et al., "Minimum Energy Mobile Wireless Networks," Proc. IEEE Int Conf. on Communications, 1998, 45 pages.

R. Wattenhofer et al., "Distributed Topology Control for Power Efficient Operation in Multihop Wireless Ad Hoc Networks," Proc. IEEE Infocom, 2001, 10 pages.

I. Stojmenovic et al., "Power-Aware Localized Routing in Wireless Networks," Proc. IEEE Int. Parallel and Distributed Processing Symp., 2000, 22 pages.

S. Singh et al., "Power-Aware Routing in Mobile Ad Hoc Networks," Proc. ACM/IEEE Int. Conf. on Mobile Computing and Networking, 1998, 10 pages.

S. Toumpis et al., "Ad Hoc Network Capacity," Asilomar Conference of Signals, Systems and Computers, 2000, 5 pages.

* cited by examiner

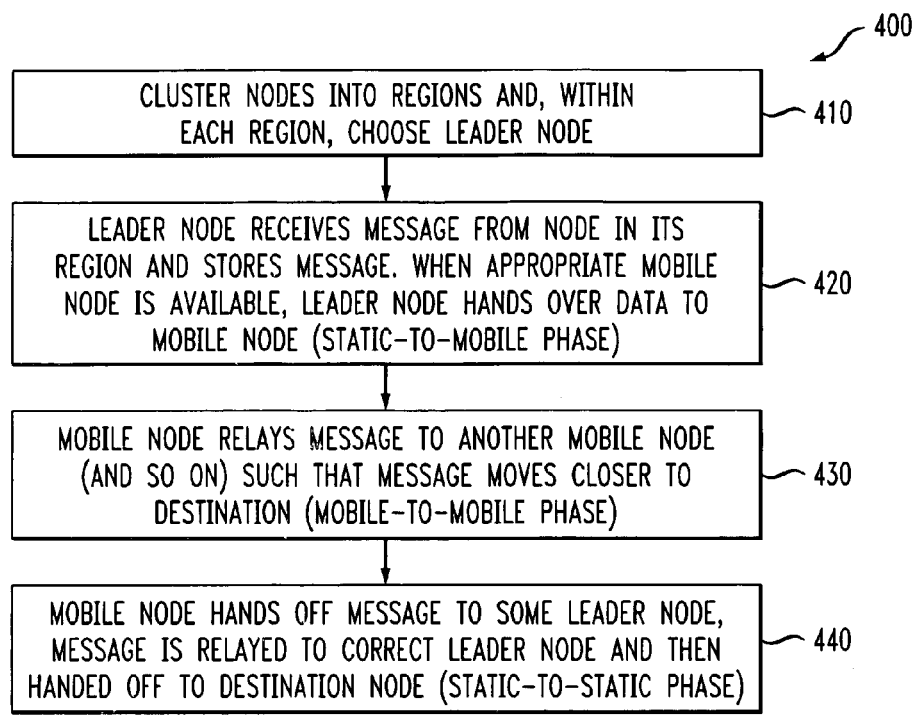
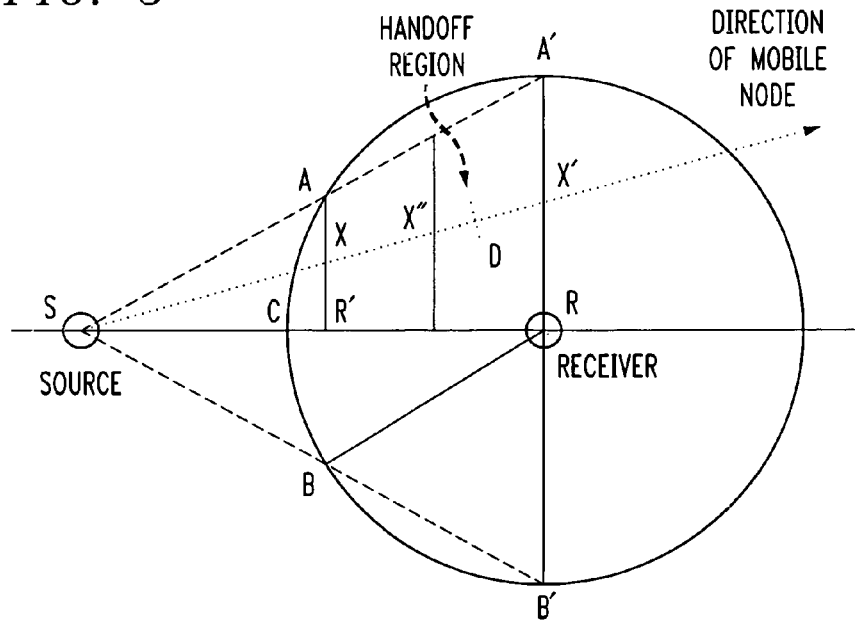

ROUTING IN WIRELESS AD-HOC NETWORKS

FIELD OF THE INVENTION

The present invention relates to wireless ad-hoc networks and, more particularly, to efficient routing techniques for use in wireless ad-hoc networks.

BACKGROUND OF THE INVENTION

A wireless ad-hoc network, also sometimes referred to as a mobile ad-hoc network (MANET), is known to comprise a set of nodes connected by wireless links. Typical examples of ad-hoc networks are wireless sensor networks, where the nodes are sensors that gather environmental data and send the information to computational nodes for further processing, or to base stations for relay to a wired network. Such networks may be deployed, for example, in hazardous locations such as in disaster areas (e.g., earthquakes, fires, etc.) to aid rescue efforts, in areas for mineral or oil prospecting, and in battlefields for defense applications. Ad-hoc networks may also be realized in the form of a short-lived network among people attending a business meeting.

The topology of an ad-hoc network is typically dynamic since nodes are free to move randomly and organize themselves arbitrarily. Therefore, the topology may be determined by the current geographic location of the nodes and other environmental conditions, and the characteristics of the radio transceivers that the nodes possess. The topology may therefore be represented as an arbitrary graph with "nodes" of the graph representing nodes in the network and "edges" of the graph representing links between nodes.

The nodes in an ad-hoc network typically attempt to communicate amongst each other by relaying packets. However, due to the limited transmission range that is characteristic of nodes in an ad-hoc network, multiple network "hops" are typically needed for one node to exchange data with another node across the network. The problem is to design efficient routing protocols to meet a variety of performance objectives given such a communications environment.

Routing efficiently in wireless ad-hoc networks poses many challenges. Some commonly studied problems include: (i) how to handle the frequent changes in the network topology due to mobility of the users, and/or failure of wireless links caused by obstruction or fading of signals; (ii) how to maintain the long multi-hop paths between two communicating nodes; and (iii) how to reduce the interference among the various users wishing to transmit, which is caused due the absence of any centralized control.

Another direction in the quest for efficient routing protocols was introduced by the work of Gupta and Kumar which focused on the capacity of wireless ad-hoc networks, see Piyush Gupta and P. R. Kumar, "The Capacity of Wireless Networks, *IEEE Transactions on Information Theory,* 46(2): 388-404, 2000, the disclosure of which is incorporated by reference herein. Gupta and Kumar first show an upper bound on the maximum possible transmission capacity achievable by any static ad-hoc wireless network and then illustrate a routing protocol for a random network which has capacity close to the optimum. Such a result, though it ignores many issues which arise in practical settings, offers important theoretical insights into the problem.

Gupta and Kumar show that the average available throughput per node decreases as the square root of the number of nodes n in a static ad-hoc network. Equivalently, the total network capacity increases as, at most, $\sqrt{n}$. Their result holds quite generally In particular, it holds irrespective of the network topology, power control policy or any transmission scheduling strategy.

Given this limitation on the achievable throughput, a natural question which arises is whether the average throughput available per node can be increased. There are two approaches discussed in the literature which attempt to address this question.

The first approach is to add relay-only nodes in the network. This increases the total network capacity, thus increasing the share available to each sender, see Gupta and Kumar. However, a major drawback of this scheme is that the number of relay nodes required is substantial. For example, in a network with 100 senders, at least 4476 relay nodes would be needed to increase the capacity five-fold.

The second approach is to add mobility. In a network where nodes move randomly in a circular disk such that their steady state distribution is uniform, Grossglauser and Tse show that it is possible for each sender-receiver pair to obtain a constant fraction of the total available bandwidth, see Mathias Grossglauser and David Tse, "Mobility Increases the Capacity of Ad-hoc Wireless Networks," In *Proceedings of IEEE Infocom '01,* Apr. 2001, the disclosure of which is incorporated by reference herein. This constant remains independent of the number of sender-receiver pairs.

However, as noted in Grossglauser and Tse, such a scheme does not provide any guarantee on the time that it takes for the packet to reach its destination, or on the size of the buffers needed at the intermediate relay nodes. In general, the delay to deliver the packet could be arbitrarily large.

Accordingly, a need still exists for efficient routing techniques that meet performance objectives associated with an ad-hoc network environment and the like.

SUMMARY OF THE INVENTION

The present invention provides efficient routing techniques that meet performance objectives associated with an ad-hoc network environment and the like. More specifically, the invention provides a routing methodology which may be proven to provide high (e.g., close-to-optimal) throughput and low delay guarantees. Further, the present invention preferably considers a network with both static and mobile nodes. The mobile nodes may follow a particular model of movement, referred to herein as a mobility model. However, the invention is not limited to a mobility model.

In one aspect of the invention, a technique for use in a node of an ad-hoc network for routing one or more packets comprises the steps/operations of: (i) obtaining mobility information associated with one or more other nodes in the ad-hoc network, the mobility information relating to a direction associated with the one or more other nodes with respect to a destination of the one or more packets; and (ii) routing the one or more packets to one of the one or more other nodes, for relay to the destination, based on the mobility information. A source and/or a destination of the one or more packets may be a mobile node. A source and/or a destination of the one or more packets may be a static node. Further, a node relaying the one or more packets may be a mobile node or a static node. Still further, a node may have a handoff region and/or a handoff deadline associated therewith.

In another aspect of the invention, a technique for routing one or more packets in a distributed network comprises the steps/operations of: (i) clustering at least a portion of static nodes in the distributed network into groups, and identifying a leader node in each group; (ii) transferring one or more packets, to be sent to a destination node, from a source node to a leader node in a group; (iii) transferring the one or more packets from the leader node through one or more available mobile relay nodes in the distributed network; and (iv) transferring the one or more packets from one of the one or more mobile relay nodes to at least one other leader node in at least one other group for delivery to the destination node.

Further, the leader node originally receiving the one or more packets from the source node may store the one or more packets until a mobile relay node is within a given proximity to the leader node. The leader node originally receiving the one or more packets from the source node may also store the one or more packets until a mobile relay node is identified as moving in a direction toward the destination node. The one or more packets may be transferred from one mobile relay node to another mobile relay node such that the one or more packets get closer to the destination node with each transfer. Transfers of packets between nodes may be performed in accordance with different frequency channels so as to at least minimize interference.

Still further, the invention provides that, in the case where there are m mobile nodes and n static nodes in the distributed network, each source node may achieve an average throughput of $$c\frac{Wm}{n\log^3 n},$$

where W is the maximum available bandwidth and c is a constant greater than zero. Further, a maximum delay incurred by a packet may be at most $$\frac{2d}{v},$$

where d is the diameter of the network and $v$ is the velocity of the mobile nodes.

The distributed network may be an ad-hoc network, and further, nodes may communicate over wireless links.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a flow diagram illustrating a methodology for routing packets, according to an embodiment of the present invention; and FIG. 5 is a diagram illustrating a handoff process, according to an embodiment of the present invention.

DETAILED DESCRIPTION OF PREFERRED EMBODIMENTS

The following description will illustrate the invention using an exemplary ad-hoc network architecture. It should be understood, however, that the invention is not limited to use with any particular ad-hoc network architecture. Rather, the invention is more generally applicable to any network architecture in which it is desirable to perform efficient data routing.

Figure 1:
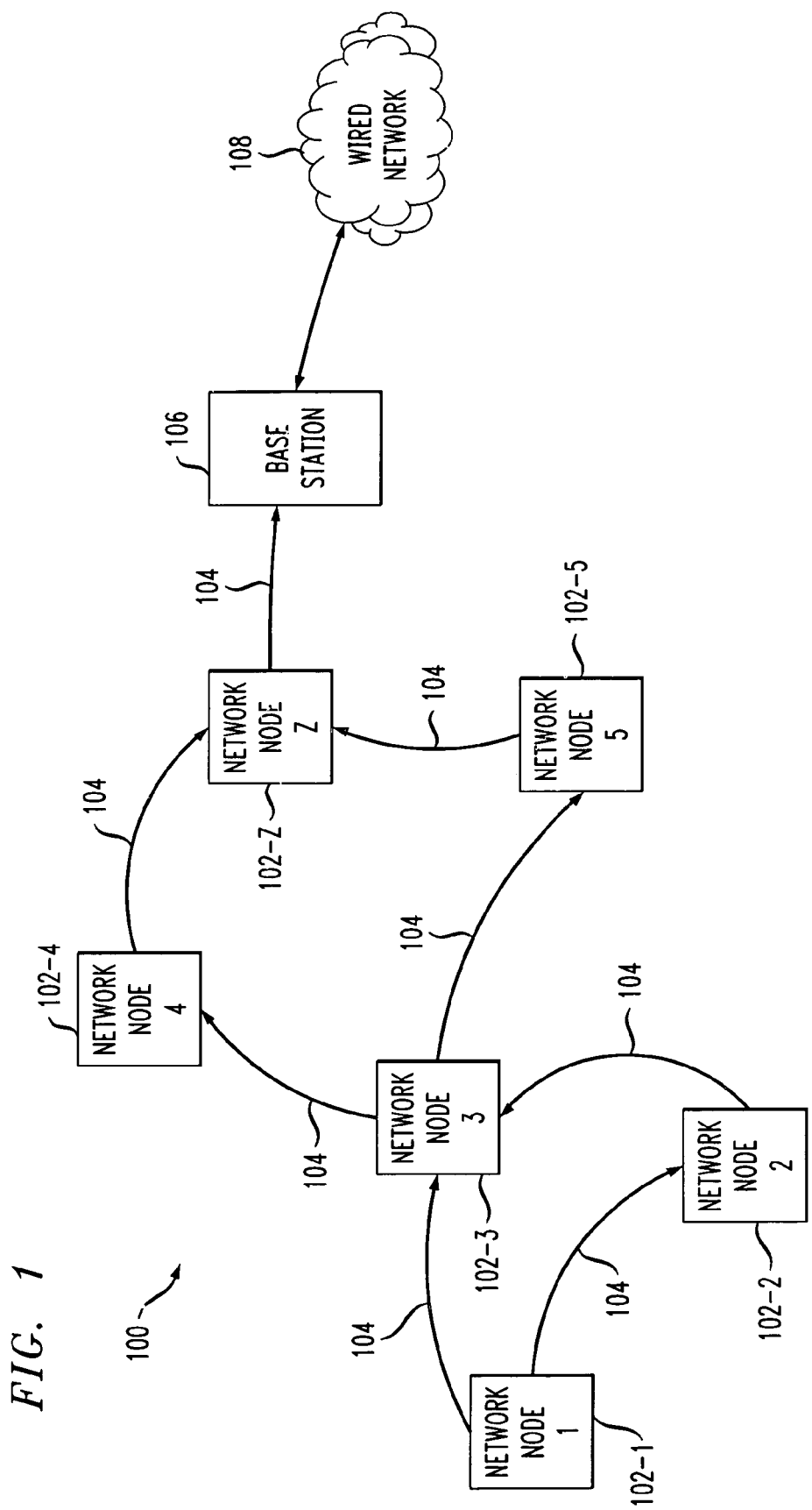
FIG. 1 is a block diagram illustrating a wireless ad-hoc network in which the techniques of the present invention may be implemented.

Referring initially to FIG. 1, a block diagram illustrates a wireless ad-hoc network in which the techniques of the present invention may be implemented. As shown, a wireless ad-hoc network 100 comprises a plurality of network nodes 102-1 through 102-Z connected by wireless links. The number of nodes Z depends on the application in which they are to be deployed and, thus, the invention is not limited to any particular number.

While nodes 102-1 through 102-Z are generally free to move randomly and organize themselves arbitrarily, and thus the topology of the ad-hoc network 100 may generally be dynamic, it is to be appreciated that in accordance with the present invention some of the network nodes may be mobile and some may be static (i.e., fixed or non-moving).

Further, nodes 102-1 through 102-Z communicate amongst each other by relaying packets. However, as mentioned above, due to the limited transmission range that is characteristic of such nodes in an ad-hoc network, multiple network hops (denoted as 104 in FIG. 1) may be needed for one node to exchange data with another node across the network 100.

Thus, as shown in FIG. 1, node 102-1 may communicate with node 102-Z by transferring packets via a wireless link to node 102-3 (first hop), which then transfers the packets via a wireless link to node 102-4 (second hop), which then transfers the packets via a wireless link to node 102-Z (third hop). Of course, depending on various factors, packets may be transferred from node 102-1 to 102-Z via other routes with more or less hops 104. It is also to be understood that, for the sake of clarity, FIG. 1 does not expressly illustrate all possible hop arrangements that may be utilized to transfer packets from one node to another. Also, it is to be appreciated that a node may have separate wireless links between itself and other nodes, however, a hop refers to the transfer of data from the node to one of the other nodes via one of its wireless links. In any case, it is to be appreciated that it is the selection of a route (i.e., determining a routing solution) in the network upon which the invention primarily focuses.

It is to be appreciated that any one of the nodes in the network 100 may serve as a computational node, wherein the packets transferred thereto may be further processed in some manner. In addition, node 102-Z, or any other receiving node within range of a base station 106 in the network, may transfer information to the base station for relay to a wired network 108. The wired network 108 may be a private data network, the Internet, etc. It is to be understood that, for the sake of clarity, only one base station and wired network is illustrated in FIG. 1; however, there may be one or more additional base stations communicating with one or more additional wired networks. Of course, it is also to be understood that network 108 could alternatively be another wireless network.

Thus, in the case where the nodes 102-1 through 102-Z are deployed in a hazardous or hostile environment in order to collect data in the environment, the data collected by the nodes may be transferred to a remote location, via the wired network 108, such that it can be presented and/or analyzed in a non-hazardous or non-hostile (or, at least, less hazardous or hostile) environment.

Figure 2:
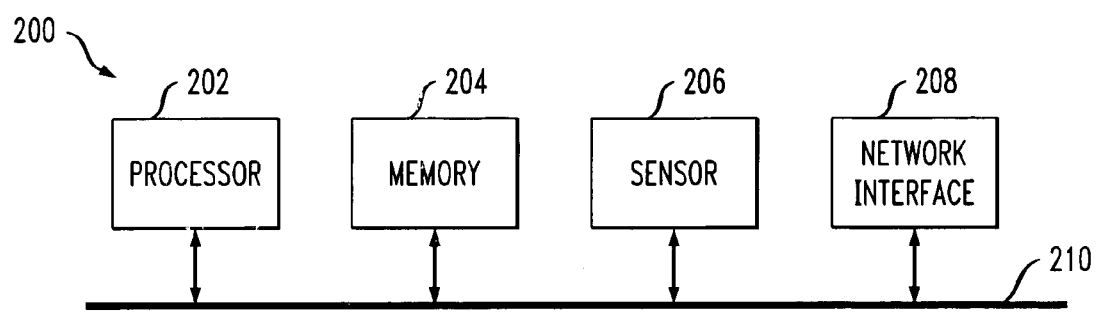
FIG. 2 is a block diagram illustrating an example of a computing system or device which may be employed to implement all or a portion of the techniques of the present invention.

Referring now to FIG. 2, a block diagram illustrates an example of a computing system or device which may be employed to implement all or a portion of the techniques of the present invention. More particularly, one or more of nodes 102-1 through 102-Z and/or base station 106 may implement such a computing system 200 to perform the techniques of the invention (although, a base station may not necessarily require a "sensor," as will be explained below). Of course, it is to be understood that the invention is not limited to any particular computing system implementation.

In this illustrative implementation, a processor 202 for implementing at least a portion of the methodologies of the invention is operatively coupled to a memory 204, a sensor 206 and a network interface 208 via a bus 210, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

Further, the term "sensor" as used herein is intended to include, for example, one or more devices capable of collecting data from the environment in which the computing system 200 (e.g., network node) is deployed. Examples of sensors may be receivers associated with wireless communication devices, which are capable of collecting data from the environment in which they are deployed. However, it is to be understood that the invention is not limited to any particular sensor. Also, a base station will typically not have a sensor.

Still further, the phrase "network interface" as used herein is intended to include, for example, one or more devices capable of allowing the computing system 200 (e.g., network node or base station) to communicate with another computing system (e.g., network node or base station). Thus, the network interface may comprise a transceiver configured to communicate with a transceiver of another computing system (e.g., network node or base station) via a suitable wireless protocol. Examples of wireless transmission protocols may be Bluetooth and IEEE 801.11. However, it is to be understood that the invention is not limited to any particular communications protocol.

It is to be appreciated that while the present invention has been described herein in the context of a network communications system, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital and analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 202.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

For ease of reference, the remainder of the detailed description is divided into the following sections: (1) Introduction; (2) Models and Results; (3) Routing Methodology; (4) Generalization of Models; and (5) Implications of Results.

1. Introduction

The present invention addresses the issue of whether mobility can be used in a way that not only can serve to obtain a close-to-optimal throughput but also can serve to provide low delay guarantees simultaneously. Further, the present invention considers a network with both static and mobile nodes. The mobile nodes may follow a particular model of movement, referred to as the mobility model (see Section 2 below). Still further, the present invention provides a routing methodology. Such inventive routing methodology may be proven to provide high throughput and low delay.

It is to be appreciated that while various simplifying assumptions about network conditions and scenarios are used in explaining the principles of the invention, the invention is not intended to be limited to these assumptions. For example, one assumption often made in obtaining lower bounds on the throughput is that all the nodes are distributed uniformly at random in the network. Similarly, the sender-receiver pairs are also chosen randomly. Indeed, if all nodes wish to send packets to one receiver, no node can receive more than $1/n^{th}$ of the bandwidth, where n is the number of the nodes. Similarly, if most nodes are concentrated in a small region, only one of them can communicate at once due to excessive interference.

2. Models and Results

In this section, in accordance with the present invention, models are defined and modeling assumptions are stated.

2.1 Network Model

The ad-hoc network considered for this illustrative explanation comprises n static nodes and m mobile nodes all lying within a disk of unit area (of radius $1/\sqrt{\pi}$). The location of the static nodes are fixed. The static nodes are distributed uniformly at random over the unit circular disk. The mobile nodes are randomly distributed in the disk at time t=0. At later times, their position and velocities are given by the mobility model described below. Without loss of generality, it will be assumed that m lies between $\sqrt{n}$ and n.

2.2 Mobility Model

Various mobility models have been considered in the literature to evaluate the effect of the node mobility on the performance of methodologies and protocols. The most widely used of these is the "random waypoint model" described in D. B. Johnson et al., "Dynamic Source Routing in Ad-hoc Wireless Networks," *Mobile Computing*, volume 353, Kluwer Academic Publishers, 1996, the disclosure of which is incorporated by reference herein.

Random waypoint Model: In this model, a node chooses a destination distributed uniformly at random in the unit disk and moves in that direction with a speed $\upsilon$. The speed is chosen uniformly in some interval $(0, \upsilon_{max})$. Upon reaching the destination, the node pauses for some time distributed according to some random variable and the process repeats itself.

Other models include random Gauss-Markov models described in B. Liang et al., "Predictive Distance-based Mobility Management for PCS Networks," *Proceedings of IEEE Infocom '99*, 1999, the disclosure of which is incorporated by reference herein, and fluid flow models described in H. Xie et al., "Mobility Models and Biased Sampling Problem," *IEEE ICUPC*, volume 2, pages 803-807, 1993, the disclosure of which is incorporated by reference herein. Such mobility models are also described in X. Hong et al., "A Group Mobility Model for Ad-hoc Wireless Networks," 1999, the disclosure of which is incorporated by reference herein.

The present disclosure presents a uniform mobility model. It is important, however, to note that the present invention is not restricted to this mobility model which is used for the presentation of the optimality assertions. That is, the techniques of the invention can be applied without this mobility model. This model has the advantage of being analytically tractable. A description of the model now follows.

Uniform Mobility Model: In this model, each of the m mobile nodes move at speed $\upsilon$ inside the unit circular disk. At time $t=0$, the position of these nodes are distributed uniformly at random inside the disk. Moreover, the directions of motion of the m nodes at time $t=0$ are independent and identically distributed and uniformly distributed in $(0, 2\pi)$.

At subsequent times, a node behaves as follows. The node picks a direction uniformly at random from $(0, 2\pi)$ and moves in that direction for a distance d, at speed $\upsilon$, where d is an exponentially distributed random variable with mean $\kappa$. The process repeats when the node reaches the distance d. If the node hits the boundary of the disk, it is reflected at the boundary.

Advantageously, the uniform mobility model described above has the following provable properties:

1. Given a time t, the position of the mobile nodes at time t are independent of each other.

2. The steady state distribution of the mobile nodes over the disk is uniform.

3. Conditional on the position of a mobile node in the disk, the direction of the node is uniformly distributed in $(0, 2\pi)$.

2.3 Transmission Model

At time t, let $S_1, S_2, \ldots, S_m$ be the senders with positions $X_1, \ldots, X_m$ and let R be the receiver with position $X_0$. If $S_i$ uses power $P_i(t)$ for transmission, the strength of the signal received at R is $$\frac{P_i(t)}{\|X_i - X_0\|^{\alpha}},$$

where $\alpha > 2$. The transmission from $S_i$ to R is successful if:

$$\frac{P_i(t)\|X_i - X_0\|^{-\alpha}}{N + \sum_{k \neq i} P_k(t)\|X_k - x_0\|^{-\alpha}} \geq \beta$$

The constant $\beta$ is the signal-to-noise ratio (SNR) for the transmission channel. The maximum available bandwidth will be denoted by W.

2.4 Performance Metric

It is assumed that there are n sender-destination pairs. In particular, each static node i will act as a source (also known as a sender) transmitting to some other static destination (also known as a receiver) node d(i). Each source chooses its destination uniformly at random.

A scheduling policy y chooses which sender sends data at time t, and the power levels $P_i(t)$ for node i. Given a scheduling and relay policy $\gamma$, it can be stated that $\gamma$ achieves a throughput of $\lambda(n)$ if it is possible for each source to send data at the rate $\lambda(n)$.

2.5 Preliminaries

Intuitively, if a node S transmits a message to some node at a distance, d, then due to the nature of wireless transmission, this causes an interference to all the nodes within a distance of approximately d from S. Hence, if the average distance of transmission is about d, then at most $n/d^2$ users can transmit simultaneously.

This forms the basis of the result of Gupta and Kumar (cited above). Since the length of paths between source to destination will be $\sqrt{n}/d$ on the average, this implies that the total throughput can be, at most, $(n/d^2)/(\sqrt{n}/d=\sqrt{n}/d$. Thus, it helps to have short range transmissions (i.e., d=1) and hence the total capacity can increase, at most, as $\sqrt{n}$.

Obtaining an $\Omega(1)$ average throughput per node is a very stringent requirement and it implies several things. First, this means that each node must be sending packets to its destination for a constant fraction of the time. Second, each packet traveling from source to destination must involve at most a constant number of relays. The idea of Grossglauser and Tse (cited above) is that each node hands over a packet to its nearby mobile node at all times. When the mobile node is close to the destination node, it hands over the packet to the destination. Note that this does not provide any guarantees on how long the packet will take to reach the destination.

In accordance with the present invention, as will be explained, a bounded delay and a good throughput can be ensured. To accomplish this, several things are ensured. First, to provide good delay guarantees, it is assumed that the position of the destination is fixed. Indeed, if the destination is a mobile node, guarantees on the delay are not possible, unless some assumptions are made (as will be seen below). Hence, it is assumed that the sources and destinations are static nodes, which use the mobile nodes as relays in order to achieve a throughput greater than $\sqrt{n}$.

Second, to obtain a constant throughput per sender, senders need to be able to transmit most of the time. Observe that if the number of mobile nodes is $o(\sqrt{n})$, then at any time, at most, $o(\sqrt{n})$ static nodes could be communicating with mobile nodes and thus the throughout will only be $(o\sqrt{n})$. Similarly, more than n mobile nodes do not help, since the total throughput is bounded by the number of static nodes (n). Throughout this explanation, it is assumed that the number of mobile nodes, m, is a number between $\sqrt{n}$ and n.

Third, the number of relays per packet should not be too large. To accomplish this, the patterns in the mobility of nodes are exploited.

Finally, to ensure a small delay, it should be ensured that a packet does not stray along the path. Note that, at any time, a relay node will have several packets corresponding to various destinations. If it meets another relay node along its way, it has to hand over some of these packets to the relay. However, it cannot hand over all those packets, since the duration during which they are nearest neighbors (hence are in communicating range) is quite small. Hence, a process is needed to decide which packets need to be handed off. Observe that this is not a issue if delays are not taken into consideration. The present invention provides methodologies for handling and analyzing delays.

Lastly, another possible model may be where the mobile nodes are dedicated as relays and their paths and motion are dictated by the requirements of the static nodes. However, this gives a different feel to the problem, in this case it can be modeled as a network flow problem. In the uniform mobility model of the invention, the mobile nodes may correspond to users traveling in cars, airplanes, etc., which have their own pattern of movement. These users have a wireless device, which potentially other static devices can use. But clearly, it cannot be expected that the wireless device dictate the movement of the user.

2.6 Modeling Assumptions

It is assumed that the following assumptions hold:

1. The locations of the static nodes are known to other nodes. This is a reasonable assumption since this information can be obtained through some location services or protocols (see, e.g., Jinyang Li et al., A Scalable Location Service for Geographic Ad-hoc Routing," *ACM Mobicom*, 2000, the disclosure of which is incorporated by reference herein), and then stored in the nodes.

2. The mobile nodes know the direction in which they are moving, up to some degree of accuracy. This is easy to do if the network has Global Positioning System (GPS) support. Even if GPS support is unavailable, the mobile node can detect its direction by observing the sequence of static nodes which are closest to it which it encounters. Detecting close-by static nodes may be done using signal strengths.

3. A mobile node knows how far it will move in a line before changing direction. This, for example, is true in the random way point model, and also in real life situations where nodes know their destination.

4. For ease of exposition, it is assumed that κ, in the mobility model, is of the order of the diameter of the network. In section 4 below, this assumption is removed.

2.7 Main Results

The present invention illustratively considers a mobile ad-hoc network satisfying the following conditions:

1. There are n static nodes uniformly distributed in a disk, and m mobile nodes which move according to the uniform mobility model in the unit disk.

2. The n sender-receiver pairs are chosen randomly according to a uniform distribution, among the static nodes.

Given these conditions, the present invention provides that there exists a constant c>0, such that each sender can achieve an average throughput of $$c \frac{Wm}{n \log^3 n},$$

where W is the maximum available bandwidth. Moreover, the maximum delay incurred by the packet is at most $$\frac{2d}{v},$$

where d is the diameter of the network and $v$ is the velocity of the mobile nodes. Note that the best achievable λ(n) with m mobile nodes is O(wm/n).

3. Routing Methodology

The following description in this section provides an explanation of a routing methodology according to an embodiment of the present invention, followed by details and analysis. More general models are analyzed in the next section.

3.1 Methodology

Figure 3:
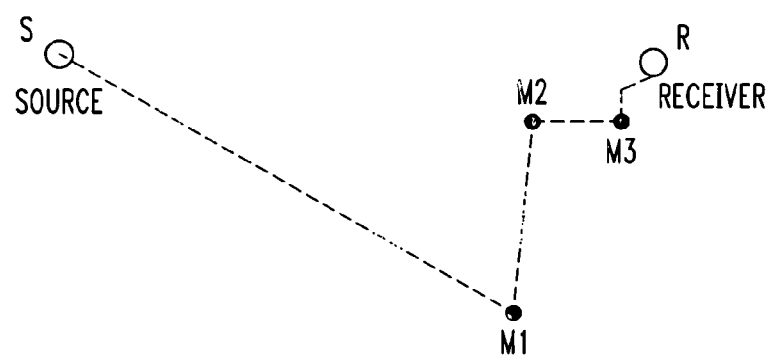
FIG. 3 is a block diagram generally illustrating routing of packets, according to an embodiment of the present invention.

Referring now to FIG. 3, a block diagram generally illustrates routing of a message (e.g., one or more packets) from a source node S in a wireless ad-hoc network (e.g., such as the wireless ad-hoc network 100 shown in FIG. 1) to a destination node R via mobile nodes M1, M2 and M3, according to an embodiment of the present invention. A general description of how such routing is accomplished will now provided in the context of FIG. 4.

Referring now to FIG. 4, a flow diagram illustrates a methodology 400 for routing packets according to an embodiment of the present invention. In accordance with this description, reference will be made back to the nodes of FIG. 3. However, it is to be understood that the inventive routing methodology is not limited to the node configuration shown in FIG. 3. Rather, the node configuration in FIG. 3 is presented for simplicity in understanding the steps of the routing methodology of the invention. Of course, other node configurations (e.g., with fewer nodes or with more nodes) may be employed in the implementation of the principles of the invention.

As shown in step 410 of routing methodology 400, nodes are grouped into small regions referred to as clusters, and within each cluster a leader node is chosen by the static nodes. More specifically, within each region of size $1/\sqrt{m} \times 1/\sqrt{m}$, the static nodes choose a local leader. This leader will be responsible for communicating all the messages of the static nodes in its region with the mobile nodes. Note that there will be m local leaders. Clustering is further described below.

In step 420, a static node $S_1$ wanting to send a message (e.g., one or more packets) to destination R first transfers its message to its leader node (S). S stores the message and waits for a mobile node ($M_1$) such that $M_1$ is close enough (which will be described in detail below) to S and moving approximately along the direction of R. When such a node is available, S hands over (transfers) the data to $M_1$. This is referred to herein as the static-to-mobile phase and is further described below.

In step 430, the mobile nodes relay the packets intended for R amongst themselves (e.g., as shown in FIG. 3, $M_1$ to $M_2$ to $M_3$) such that the packets move closer and closer to the destination. This is referred to herein as the mobile-to-mobile phase and is further described below.

In step 440, when the mobile relay carrying the packets is close enough to the destination, it hands off (transfers) the packets to some leader node (not shown in FIG. 3). These packets are then routed among the leader nodes towards the correct leader node, which then transmits the packets to the destination node. This is referred to herein as the static-to-static phase and is further described below.

Observe that in the methodology, the various phases may be executing simultaneously, i.e., multiple nodes transferring multiple messages from multiple sources to multiple receivers, thus allowing phases to concurrently occur for different transfers. The signals used in these different phases may cause interference to each other. Thus, each of these phases preferably use different frequency channels, and hence they do not interfere with each other. In particular, it may be assumed that each of the phases has a maximum allocated bandwidth of W/4. In the entire methodology, it may be assumed that all nodes transmit at unit power. It may be shown that each leader node can obtain a throughput of $\Omega W/\log^3 n$). Within each region of a leader, there may be $O(n/m)$ static nodes. This implies that leader static node can get a throughput of $\Omega(Wm/n \log^3 n)$.

3.2 Clustering Nodes

The step of clustering nodes (e.g., step 410 of FIG. 4) will now be further described. If $m > n/(16 \log n)$, let $m = n/(16 \log n)$. Consider a virtual grid comprising m nodes with the distance between the neighbors being $m^{-1/2}$. It follows from standard Chernoff bounds that each of the grid nodes has a static node within a distance of $\sqrt{\log n/n}$, with probability at least $1-n^{-2}$. One of these static nodes is chosen as the leader node corresponding to the square region of side $m^{-1/2}$ around each grid node. Since the grid nodes are separated by a distance of $m^{-1/2}$, the distance between any two leader nodes will be at least $m^{-1/2} - 2\sqrt{\log n/n}$. Finally, applying Chernoff bounds again, it is observed that each region comprises $O(n/m)$ static nodes. Intuitively, if the static nodes that are not leaders are ignored, then the network has m mobile nodes and m leaders where the leaders are arranged in a grid like structure (i.e., no two are very close to each other).

Communication takes place as follows. In each region (cluster), only the leader node is responsible for communicating with the mobile node. A static node that wants to transmit a packet first sends the packet to the leader of the cluster to which the static node belongs. The packet is then routed among the leader and the mobile nodes. Finally, the leader sends the packet to the destination by local routing within a cluster. Note that if the throughput available to the leader is $\lambda$, then each static node gets throughput of $\Omega(m\lambda/n)$ using any straightforward sharing scheme.

3.3 Static-To-Mobile Phase

In this mode (e.g., step 420 of FIG. 4), a static node first hands off the data to be delivered to a mobile node. Referring now to FIG. 5, a diagram illustrates the operation of handing off a packet to a mobile node. Given the source node S (which wants to hand off data to another mobile node and the destination node R, consider the line joining S and R. Let $\theta$ be the slope of SR ($\theta=0$ in FIG. 5). Let G(S, R) denote the region between the directions $$[\theta - \frac{\pi}{6}, \theta + \frac{\pi}{6}]$$

originating at S and containing R. Note that the choice of the angle $\pi/6$ is arbitrary; any angle from 0 to $\pi/3$ would suffice. In FIG. 5, the region G(S, R) corresponds to the region between the rays SA' and SB'.

In the first step, the node at S hands over the packet to be transmitted to some mobile node $M_1$, moving in the direction $\phi$ such that $$\phi \in [\theta - \frac{\pi}{6}, \theta + \frac{\pi}{6}],$$

also $M_1$ satisfies the property that it moves in that direction for a distance of at least 2|SR| (i.e., twice the length of segment SR). Since $\kappa$ is about the diameter of the network, by our assumption, a constant fraction of the mobile nodes satisfy this property. It may be assumed that this is the case in all transmissions. This assumption is used to simply the explanation and, thus, the invention is not intended to be limited to such assumption.

There are two issues that arise in this phase;
1. Whether a static node transmitting at a rate $\lambda(n)$ can find mobile nodes moving in the right direction sufficiently often to hand off data at that rate.
2. How long does a node have to wait until it can find the right mobile node.

The present invention addresses these issues as follows. If the communication takes place only between leader nodes as senders and mobile nodes as receivers, then, if $\alpha > 2$, there is a square region of side $cm^{-1/2}$ centered at each leader, such that if the leader communicates with a mobile node in this region, then the communication is always a success.

For a static node S, let N(s) denote the square neighborhood of side $cm^{-1/2}$ centered at S. In accordance with the invention, it may be shown that the duration for which a static node S has to wait to find a mobile node in N(s) is not very high.

More specifically, consider a static node S. If T denotes the time until which a mobile node first enters N(s) then:

$$\Pr\left[T > \frac{4k \log m}{c\upsilon} \sqrt{\frac{1}{m}}\right] \leq m^{-k}$$

The above propositions provide that there is constant fraction of time when a static node can transmit data to a mobile node. The transmission from a static node s to a mobile node in the region N(s) will be successful irrespective of the transmissions from the other static nodes.

3.4 Mobile-To-Mobile Phase

A description and analysis of how handoffs from one mobile node to another take place (e.g., step 430 of FIG. 4) will now be provided. A main illustrative approach is as follows. First, for every data packet carried by a mobile node there is a point beyond which the packet is not handed to another mobile node, and it starts moving away from the destination. This leads to the notion of a handoff region. The invention ensures that every packet is handed off to another mobile node within its handoff region. Second, for every mobile node, at any moment in time there will be several packets in their handoff region. The invention thus provides a mechanism to decide which packet should be handed off first and so on. The mechanism also uses randomization so that delay guarantees can be proven. An illustrative handoff process is described below in the context of FIG. 5.

3.4.1 Handoff

Geometry: Consider FIG. 5, the mobile node $M_1$ was handed a packet from the static node S. Now, $M_1$ carries the packet until it reaches a region between the rays R'A and RA'. In this region, $M_1$ tries to hand off the packet to another mobile node $M_2$, which is moving towards R. This region is denoted as the handoff region. The handoff region is defined as follows. Line RA' is perpendicular to line SR. Line R'A is parallel to line A'R and passes through A. The handoff region is shown by the segment XX' in FIG. 5.

Scheduling: In order to handle packets that could not be transmitted in their handoff regions, a deadline is defined. Let X" denote the midpoint of the segment XX'. The mobile node chooses a point uniformly at random in the segment X"X'. This point is called the deadline for the node. Randomization is required to avoid many deadlines from being clustered together. The deadline is shown by D in FIG. 5. If the mobile node $M_1$ is unable to hand off the packet to another mobile node until it reaches the deadline D (i.e., during the interval X to D), the packet is discarded.

Finally, note that at any given time several packets will be in their handoff regions, and hence compete for being handed off to another mobile node. The conflict resolution among the various packets may be done in accordance with the Earliest Deadline First (EDF) order. For example, if either of the packets $P_1$ with deadline $D_1$ and packet $P_2$ with deadline $D_2$ can be delivered to a mobile node $M_2$, then the packet with the earlier deadline is delivered first.

The whole process repeats itself, until the mobile node reaches a distance of less than $$c \frac{\log m}{\sqrt{m}}$$

from the destination. The appropriate constant c will be discussed below.

It is to be noted:

1. Observe that the process is fully distributed, in the sense that the communication between two mobile nodes does not impose any restriction on the transmissions from other mobile nodes.

2. Note that the choice of the angle $\pi/6$ is arbitrary. In fact, a handoff to any mobile moving within an angle of $(0, \pi/3)$ suffices, since at each step, the distance to the destination decreases. The tradeoff is that a smaller choice of the angle implies a longer wait, whereas a larger angle implies a lesser wait but a possibly longer path to reach the destination.

3.4.2 Analysis of Mobile-To-Mobile Phase

A handoff is deemed successful if the packet is delivered from a mobile node $M_i$ to a mobile node $M_j$ such that the packet was in the handoff mode at the time of delivery and it was delivered before the deadline. Conditions for a successful handoff are determined as follows.

Let R be a receiving mobile node and let $M_1, \ldots, M_m$ be mobile nodes distributed uniformly and independently in the disk. Suppose that $M_1$ attempts to communicate with R. Then, the signals due to $M_2, \ldots, M_m$ received at R will cause interference to the communication between $M_1$ and R. Let $I_j$ denote the signal received at R due to $M_j$. To determine the probability of successful transmission between $M_1$ and R, the total interference $I_2 + \ldots + I_m$ is bound.

Thus, suppose that m−1 mobile nodes uniformly distributed in a disk are transmitting at unit power. Let R be a point in the interior of the disk. Then, if M is at a distance $$x < \beta^{-\frac{1}{a}} \sqrt{\frac{\epsilon}{\pi m}}$$

to point R, the transmission from M to R is successful with probability greater than 1−ε. In particular, if $\chi < \beta^{-1/a}(8\pi m \log m)^{-1/2}$, then the transmission is a success with probability at least $$\frac{1}{8 \log m}.$$

Let $r_0$ denote the distance $\beta^{-1/a}(8\pi m \log m)^{-1/2}$. Suppose two mobile nodes $M_1$ and $M_2$ communicate only when they are at a distance of $r_0$ or less. It will be stated that $M_1$ and $M_2$ encounter each other within time t, if the distance between them is less than $r_0/2$ during some time instant in $[t_0, t_0+t]$, where $t_0$ denotes the current time. Interest is in the amount of data $M_1$ can hand off to another mobile during an encounter. This amount will depend on the number of mobile nodes that $M_1$ encounters and the amount of data that can be transmitted per encounter.

Thus, if $\lambda_{mm}$ denotes the bandwidth allocated for mobile-to-mobile data transmission, then:

1. The expected data transmitted successfully during an encounter is at least $$\frac{\lambda_{mm} r_0}{2\|v\|}(1 - 1/8 \log m).$$

2. Let E denote the event that at least $$\frac{\lambda_{mm} r_0}{4\|v\|}$$

data is successfully transmitted during an encounter. Then, $\Pr[E] \geq (1 - \frac{1}{4} \log m)$. Similarly, the probability that at least $$\frac{k \lambda_{mm} r_0}{4\|v\|}$$

data is successfully transmitted during k encounters, is at least $(1 - \frac{1}{4} \log m)$.

The number of encounters which $M_1$ has in time t are now considered. Suppose the mobile node $M_1$ wants to transmit data to a destination in the direction η. Thus, $M_1$ will hand off the packet to some other mobile node $M_i$ moving in the direction φ, such that $\phi \in [\eta - \pi/6, \eta + \pi/6]$.

Given $M_1$, call a mobile node $M_i$ useful if:

1. $M_i$ moves in the direction φ such that $\phi \in [\eta - \pi/6, \eta + \pi/6]$.
2. $M_i$ encounters $M_1$ at sometime during the time $[t_0, t_0+t]$.

Let $X(\eta, t) = |\{i | i > 0 \text{ and } M_i \text{ is useful}\}|$

That is, $X(\eta, t)$ is the random variable, which denotes the number of useful mobile nodes.

The expectation of $X(\eta, t)$ is now computed and bound to obtain the desired result.

Let $M_0$ be a mobile node and let $X(\eta, t)$ be as defined above. Then, for any $\eta \in (0, 2\pi)$:

$$E[X(\eta, t)] > \frac{1}{24} m r_0 t \|v\|.$$

Moreover, for any constant $$k > 0, \text{ if } t > \frac{\log m}{\sqrt{m} \, \|v\|},$$

then:

$$\Pr\left[X(\eta, t) < \frac{1}{2} \cdot \frac{1}{24} m r_0 t \|v\|\right] = o\left(\frac{1}{\log m}\right).$$

Thus, if X(t) denotes the amount of data a mobile node M transmits in time t, then if $$t > \frac{\log m}{\sqrt{m} \, \|v\|}$$

and n is sufficiently large, then:

$$\Pr\left[X(t) > \frac{1}{48} \cdot \frac{\beta^{-\frac{2}{\alpha}}}{8\pi \log m} \lambda_{mm} t\right] > 1 - \frac{1}{3 \log m}$$

This holds irrespective of the direction in which M attempts to transmit.

Having shown bounds on the amount of data that a mobile node can hand off to other nodes, the following description will show bounds on the data received by a mobile node from other mobile nodes. This allows to bound the probability that a packet is discarded since it could not be handed off before its deadline.

Let D denote the maximum distance between the source and the destination. Thus $D=2/\sqrt{\pi}$. Call a packet to be in stage k, if the distance of the packet from the destination is between $D3^{-k/2}$ and $D3^{-k-1/2}$. Since the distance decreases by at least a factor of $\sqrt{3}$ after every handoff and the distance can vary from at most $2/\sqrt{\pi}$ to at the least $1/\sqrt{m}$, it follows that:

1. The number of different phases will be at most $\log_{\sqrt{3}} \sqrt{m}$ which is less than log m. Since each static node produces data at rate at most $\lambda(n)$, the total rate at which data is produced is $n\lambda(n)$. Thus, there is an arrival into stage k if a packet becomes a stage k packet, and similarly there is a departure from stage k if a packet leaves stage k to enter stage k+1 or higher. By this property, each packet goes through each stage at most once, thus it follows that:

2. The average arrival rate into each stage k is at most $n\lambda(n)$. Recall that a goal is to bound the data received by a mobile node. Since there are n mobile nodes, it may be expected that each node will receive stage k packets at a rate of about $n\lambda(n)/m$. However, this is not exactly true. The fact that a mobile is moving in a particular direction and is at a particular position will affect the rate at which the mobile receives packets of stage k. However, the rate can be bound by $6n\lambda(n)/m$. The idea is that, by the nature of the inventive handoff methodology, even if all the packets at a position $\vec{r}$ need to be sent in a particular direction θ, they will be spread out to mobile nodes moving in a direction between θ−π/6 and θ+π/6.

Now consider a packet which is in its handoff region deadline at a distance d. The probability that this packet meets its deadline may be bounded as follows.

Given a packet P in its handoff region with a deadline at a distance d, let H(d) denote the amount of data that has a deadline sooner than that of P, then, $$E[H(d)] < 78\lambda(n) \log n \frac{nd}{m\|v\|}.$$

Accordingly, there exists a constant c>0 such that, if $$\lambda(n) \leq \frac{cWm}{n \log^3 n},$$

then the probability that a handoff is not successful is at most $$\frac{1}{2\log m}.$$

3.5 Static-To-Static Phase

Finally, it is to be noted that after the mobile-to-mobile phase, the distance of a packet from the destination leader node is at most $$\frac{\log m}{\sqrt{m}}.$$

In the next stage (e.g., step 440 of FIG. 4), the intermediate static leader node directly transmits the packet to the destination leader node. The coordination among the leader nodes is done as follows.

In each time slot, choose a fraction of $$\frac{c^2}{\log^2 m}$$

of the static nodes such that each of them are at distance of at least $$\frac{\log m}{c\sqrt{m}}$$

from each other. Observe that if c is sufficiently small, then it follows that this fraction of nodes can simultaneously transmit the packets directly to its intended destination.

Since W/4 is the bandwidth available to each leader node for communication in the static-to-static phase, this constrains $\lambda(n)$ to $$\Theta\left(m \frac{W}{n \log^2 m}\right).$$

A function $f(n)$ is $\Theta(g(n))$, if $\exists$ constants $C_1$, $C_2$ and N such that $c_1 g(n) \leq l(n) \leq c_2 g(n)$, $\forall n > N$. Thus, the achievable throughput per leader node in this phase is $$\Omega\left(\frac{W}{\log^2 m}\right).$$

Since there are O(n/m) static nodes per leader node, this constrains the available λ(n) to Ω(mW/n log² m).

4. Generalization of Models

In this section, in accordance with the present invention, generalizations regarding models defined above are provided.

It is to be appreciated that mobile nodes may be senders and/or receivers. An assumption about the model may be made that a mobile node has a designated static node from where it periodically collects its packets. If this is the case, then guarantees on delay may be obtained.

It is also to be appreciated that, in accordance with the present invention, the roles of mobile nodes and static nodes can be reversed. Indeed, the mobile nodes will be source and destination nodes, whereas static nodes are used for relaying. Relative to these mobile nodes (for example, an airplane in flight serving as a node), the static nodes may be considered as "mobile." That is, from the perspective of a mobile node, a static node may be viewed as moving around. Thus, a static node can make forwarding decisions (as described above) accordingly by using the "mobility" information of other static nodes with respect to the final destination (which may, for example, be another airplane in flight serving as a node).

Furthermore, if the value of κ (the mean distance that a mobile node moves before changing its direction) is much smaller than the diameter of the network (d), the following two things can be done:

1. Either modify the routing methodology such that instead of sending the packet from the static source node S to the static receiver node R using mobile nodes, intermediate nodes $S_1, \ldots, S_{d/\kappa}$ are chosen, such that packets are first routed from S to $S_1$, then from $S_1$ to $S_2$ and so on. Note that capacity of the network becomes directly proportional to κ. Hence, the smaller the κ, the smaller the capacity.

2. Alternatively, the following can be done: Hand over a packet to a mobile node, either if it moves in that direction for a distance more than κ or if it moves in that direction for a distance larger than twice the distance from the destination (as above in section 3). In the first case, the deadline is set randomly between κ/2 and 3κ/4. Note that the node moves a distance of at least κ/2 in this way, and a constant fraction (>1/e) of mobile nodes can be found which satisfy this property. Thus, there are at most 1/κ such steps. In the second case, the analysis remains the same as that in section 3 and there are log n such steps. Thus, a throughput of the order of Wm/(n log² n(log n+1/κ)) is obtained.

Finally, we note that the above results may be extended to the following:

1. The results still hold (up to a multiplicative constant) for models where the steady state distribution of the static nodes is some homogeneous distribution rather than the special case of the uniform distribution. Here, a homogeneous distribution refers to a distribution in which the probability distribution function lies between constants $c_{min}$ and $c_{max}$.

2. Similarly, the speeds of mobile nodes need not be identical. If they are upper and lower bounded by $\upsilon_{max}$ and $\upsilon_{min}$, respectively, the above analyses applies except for different constants.

3. The results can also be rederived for a three dimensional setting.

5. Implications of Results

In this section, some implications of the results obtained in the previous sections are provided. The following may be observed:

1. The delay experienced by a packet is inversely proportional to the speed of the mobile nodes.

2. The throughput λ(n) obtained is independent of the velocity of the mobile nodes.

3. Above, only bounds on λ(n) which ensure a packet loss probability of at most 0.5 are derived. This happens since the loss probability at each handoff is bound by ½ log m. Note that the loss takes place due to two things. First, loss is due to the wireless communication. To handle this, the value of x (i.e., two nodes communicate only when they are extremely close) can be reduced. Second, the loss also occurs when a mobile node cannot hand off all its packets by their deadlines to appropriate mobile nodes and hence has to discard them. This can be addressed by choosing a larger constant in the application of Markov's Inequality. This reduces the value of λ(n) by the same constant (i.e., if p is the loss probability, then λ(n) ∝p).

4. Bounds can be obtained on the expected buffer occupancy at the mobile nodes. In particular, by applying Little's Law (J. Little, "A Proof of the Queuing Formula l=λw," Operations Research, 9:383-387, 1961, the disclosure of which is incorporated by reference herein), the expected amount of data in the buffers may be bounded by $$\frac{2d}{\upsilon} \frac{W}{\log^3 n}.$$

Accordingly, as explained in detail above, the present invention provides a routing methodology for ad-hoc networks with a goal of achieving close-to-optimal capacity while keeping the delay small. The methodology exploits the patterns in the mobility of nodes to provide guarantees on the delay. Moreover, the throughput achieved by the methodology is only a poly-logarithmic factor off from the optimal.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in a node of an ad-hoc network for routing one or more packets, the method comprising the steps of:

obtaining mobility information associated with one or more other nodes in the ad-hoc network, the mobility information relating to a direction of movement of the one or more other nodes relative to a destination of the one or more packets; and routing the one or more packets to one of the one or more other nodes, for relay to the destination, based on the mobility information.

2. The method of claim 1, wherein at least one of a source and the destination of the one or more packets is a mobile node.

3. The method of claim 1, wherein at least one of a source and the destination of the one or more packets is a static node.

4. The method of claim 1, wherein a node relaying the one or more packets is a mobile node.

5. The method of claim 1, wherein a node relaying the one or more packets is a static node.

6. The method of claim 1, wherein a node has a handoff region associated therewith.

7. A method for use in a node of an ad-hoc network for routing one or more packets, the method comprising the steps of:
obtaining mobility information associated with one or more other nodes in the ad-hoc network, the mobility information relating to a direction associated with the one or more other nodes with respect to a destination of the one or more packets; and
routing the one or more packets to one of the one or more other nodes, for relay to the destination, based on the mobility information,
wherein at least one node in the ad-hoc network has a handoff deadline associated therewith.

8. A method of routing one or more packets in a distributed network, the method comprising the steps of:
clustering at least a portion of static nodes in the distributed network into groups, and identifying a leader node in each group;
transferring one or more packets, to be sent to a destination node, from a source node to a leader node in a group;
transferring the one or more packets from the leader node through one or more available mobile relay nodes in the distributed network; and
transferring the one or more packets from one of the one or more mobile relay nodes to at least one other leader node in at least one other group for delivery to the destination node;
wherein the leader node originally receiving the one or more packets from the source node stores the one or more packets until a mobile relay node is within a given proximity to the leader node.

9. The method of claim 8, wherein at least one of the source node and the destination node is static.

10. The method of claim 8, wherein at least one of the source node and the destination node is mobile.

11. The method of claim 8, wherein transfers of packets between nodes are performed in accordance with different frequency channels so as to at least minimize interference.

12. The method of claim 8, wherein a mobile relay node has a handoff region associated therewith.

13. The method of claim 8, wherein a leader node is a source node.

14. The method of claim 8, wherein the distributed network is an ad-hoc network, and further wherein nodes communicate over wireless links.

15. A method of routing one or more packets in a distributed network, the method comprising the steps of:
clustering at least a portion of static nodes in the distributed network into groups, and identifying a leader node in each group;
transferring one or more packets, to be sent to a destination node, from a source node to a leader node in a group;
transferring the one or more packets from the leader node through one or more available mobile relay nodes in the distributed network; and
transferring the one or more packets from one of the one or more mobile relay nodes to at least one other leader node in at least one other group for delivery to the destination node;
wherein the leader node originally receiving the one or more packets from the source node stores the one or more packets until a mobile relay node is identified as moving in a direction toward the destination node.

16. A method of routing one or more packets in a distributed network, the method comprising the steps of:
clustering at least a portion of static nodes in the distributed network into groups, and identifying a leader node in each group;
transferring one or more packets, to be sent to a destination node, from a source node to a leader node in a group;
transferring the one or more packets from the leader node through one or more available mobile relay nodes in the distributed network; and
transferring the one or more packets from one of the one or more mobile relay nodes to at least one other leader node in at least one other group for delivery to the destination node;
wherein the one or more packets are transferred from one mobile relay node to another mobile relay node such that the one or more packets get closer to the destination node with each transfer.

17. A method of routing one or more packets in a distributed network, the method comprising the steps of:
clustering at least a portion of static nodes in the distributed network into groups, and identifying a leader node in each group;
transferring one or more packets, to be sent to a destination node, from a source node to a leader node in a group;
transferring the one or more packets from the leader node through one or more available mobile relay nodes in the distributed network; and
transferring the one or more packets from one of the one or more mobile relay nodes to at least one other leader node in at least one other group for delivery to the destination node;
wherein the leader node originally receiving the one or more packets from the source node stores the one or more packets until a mobile relay node is within a given proximity to the leader node,
wherein at least one mobile relay node in the distributed network has a handoff deadline associated therewith.

18. A method of routing one or more packets in a distributed network, the method comprising the steps of:
clustering at least a portion of static nodes in the distributed network into groups, and identifying a leader node in each group;
transferring one or more packets, to be sent to a destination node, from a source node to a leader node in a group;
transferring the one or more packets from the leader node through one or more available mobile relay nodes in the distributed network; and
transferring the one or more packets from one of the one or more mobile relay nodes to at least one other leader node in at least one other group for delivery to the destination node;
wherein there are m mobile nodes and n static nodes in the distributed network and further wherein each source node can achieve an average throughput of $$c\frac{Wm}{n\log^3 n},$$

where W is the maximum available bandwidth and c is a constant greater than zero.

19. A method of routing one or more packets in a distributed network, the method comprising the steps of:
clustering at least a portion of static nodes in the distributed network into groups, and identifying a leader node in each group;

transferring one or more packets, to be sent to a destination node, from a source node to a leader node in a group;

transferring the one or more packets from the leader node through one or more available mobile relay nodes in the distributed network; and transferring the one or more packets from one of the one or more mobile relay nodes to at least one other leader node in at least one other group for delivery to the destination node;

wherein a maximum delay incurred by a packet is at most $$\frac{2d}{v},$$

where d is the diameter of the network and v is the velocity of the mobile nodes.

20. A method for use in a static node of a distributed network for routing packets, the method comprising the steps of:

identifying the node as a leader node of a group comprising a plurality of static nodes in the distributed network, and storing one or more packets to be sent to a destination node in the leader node; and transferring the one or more packets from the leader node to at least one available mobile relay node in the distributed network wherein the one or more packets may then be transferred to at least another leader node in at least another group for delivery to the destination node.

21. A method for use in a mobile node of a distributed network for routing packets, the method comprising the steps of:

receiving one or more packets from a node in the distributed network identified as a leader node, the leader node serving as a leader of a group comprising a plurality of static nodes in the distributed network; and relaying the one or more packets from the mobile node through one or more other mobile nodes in the distributed network wherein the one or more packets may be transferred from one of the one or more mobile nodes to at least another leader node in at least another group for delivery to the destination node.

22. Apparatus for use in a node of an ad-hoc network for routing one or more packets, the apparatus comprising:

a memory; and at least one processor coupled to the memory and operative to: (i) obtain mobility information associated with one or more other nodes in the ad-hoc network, the mobility information relating to a direction of movement of the one or more other nodes relative to a destination of the one or more packets; and (ii) route the one or more packets to one of the one or more other nodes, for relay to the destination, based on the mobility information.

23. The apparatus of claim 22, wherein at least one of a source and the destination of the one or more packets is a mobile node.

24. The apparatus of claim 22, wherein at least one of a source and the destination of the one or more packets is a static node.

25. The apparatus of claim 22, wherein a node relaying the one or more packets is a mobile node.

26. The apparatus of claim 22, wherein a node relaying the one or more packets is a static node.

27. The apparatus of claim 22, wherein a node has a handoff region associated therewith.

28. Apparatus for use in a node of an ad-hoc network for routing one or more packets, the apparatus comprising:

a memory; and at least one processor coupled to the memory and operative to: (i) obtain mobility information associated with one or more other nodes in the ad-hoc network, the mobility information relating to a direction associated with the one or more other nodes with respect to a destination of the one or more packets; and (ii) route the one or more packets to one of the one or more other nodes, for relay to the destination, based on the mobility information, wherein at least one node in the ad-hoc network has a handoff deadline associated therewith.

29. An article of manufacture for use in a node of an ad-hoc network for routing one or more packets, comprising a computer readable storage medium containing one or more programs which when executed by a computer implement the steps of:

obtaining mobility information associated with one or more other nodes in the ad-hoc network, the mobility information relating to a direction of movement of the one or more other nodes relative to a destination of the one or more packets; and routing the one or more packets to one of the one or more other nodes, for relay to the destination, based on the mobility information.

* * * * *